United States Patent

[11] 3,601,806

[72] Inventor Gary L. Heimbigner
Anaheim, Calif.
[21] Appl. No. 835,320
[22] Filed June 23, 1969
[45] Patented Aug. 24, 1971
[73] Assignee North American Rockwell Corporation

[54] DIGITAL TIME MULTIPLEXED BIDIRECTIONAL COMMUNICATIONS SYSTEM

17 Claims, 5 Drawing Figs.

[52] U.S. Cl. 340/151, 178/50, 178/58, 340/147 PC, 340/163
[51] Int. Cl. H04q 9/14
[50] Field of Search 178/58, 50, 4.1; 340/147, 151, 163

[56] References Cited

UNITED STATES PATENTS

| | | | |
|---|---|---|---|
| 3,214,734 | 10/1965 | Whitehead | 340/163 |
| 3,510,841 | 5/1970 | Lejon | 340/151 |

*Primary Examiner*—Donald J. Yusko
*Attorneys*—L. Lee Humphries, Edward Dugas, N. Fredrick Hamann and Robert G. Rogers

ABSTRACT: Digital signals are bidirectionally transmitted between a master station and a plurality of remote stations on a single wire which serially interconnects all the stations. A connection is provided from the last remote station directly back to the master station. Each station is successively interrogated by means of clock pulses transmitted from the master station, data being transmitted from the master station to the remote station on certain predetermined digital bits established by the clock pulses and data being transmitted from the remote station to the master station on certain other predetermined bits. When the predetermined bit count for each remote station has been completed, this station is deactivated and clock and data pulses are bypassed through this station in either direction to provide communications between the master station and another remote station. This interrogation and bidirectional transmission of data is repeated successively for each remote station until all in turn have been interrogated.

INVENTOR.
GARY L. HEIMBIGNER

INVENTOR.
GARY L. HEIMBIGNER

INVENTOR.
GARY L. HEIMBIGNER

INVENTOR.
GARY L. HEIMBIGNER

DIGITAL TIME MULTIPLEXED BIDIRECTIONAL COMMUNICATIONS SYSTEM

BACKGROUND OF THE INVENTION

This invention relates to digital time multiplexing, and more particularly to a system for enabling bidirectional communication between a master station and a plurality of serially arranged remote stations on a single wire interconnecting such stations.

In a commercial passenger aircraft, a plurality of bits of data must be transmitted from a central control station to each of the passenger seat locations, e.g., to provide testing of read and call lamps. In turn, various data bits must be transmitted back to the master station from each of the passenger locations indicating such messages as calls from the passengers, the condition of the passenger's seat belt, etc. In communications systems of this type of the prior art, separate wires generally run from each seat position to control each of the desired functions. This greatly adds to the complexity of the installation and in large superplanes of the type now being contemplated having over 400 seat positions, can add a significant amount of weight to the plane. Further, the use of such a vast amount of cabling to perform the desired functions presents a repair and reliability problem.

The system of this invention overcomes the shortcomings of prior art multiwire communications systems by providing means for transmitting all of the communications between a master and remote stations on a single wire which serially interconnects all of the stations. Repair is facilitated in view of the fact that only a single wire need be checked for breaks. Further, means are provided in the system of the invention for communicating from the master to the remote stations in either of two directions so that if there is a break in the line, communications are not interrupted.

This end result is achieved in the system of the invention by time sharing the transmission and reception of digital signals and by providing a bidirectional signal flow between a master and a plurality of remote stations, the signals being bypassed through a remote station to the next succeeding station when all the bits of data for this station have been handled.

It is therefore the principal object of this invention to enable the efficient bidirectional communication of data between a master station and a plurality of remote stations on a single wire by means of time multiplexing techniques.

Other objects of this invention will become apparent as the description proceeds in connection with the accompanying drawings, of which:

SUMMARY OF THE INVENTION

Briefly described, the system of the invention comprises a master station for transmitting a train of clock pulses and data signals representing commands for the remote stations, these commands being sent in a predetermined sequence and associated with predetermined pulses in the clock pulse train. The remote stations each successively operate in an active mode during which command data can be received from the master and acted upon, and bits of data can be sent back to the master station, and an inactive mode during which signals received at the station on the single wire line from both the master station and other remote stations are bypassed through in either direction as the situation may demand.

In the active mode of operation, a counter counts the pulses arriving from the master station. The state of the counter is determined by a decoder which thus identifies each bit so it can be associated with its particular function. The data associated with each clock pulse sequentially follows such pulse and is correlated with its proper identifying bit by means of the count decoder. When all the bits for the station have been counted and the data communicated between the master and the remote station and the remote station and the master, the counter reaches an overflow condition at which time the remote station goes into its inactive mode of operation, wherein signals arriving on the line from either direction are bypassed therethrough.

In this inactive mode, a direction detector is utilized to determine the direction in which clock pulses are arriving at the remote station and the direction detector is utilized to steer both data and clock signals through the station. These clock and data signals are thus steered through the station in either one direction or the other, depending upon the direction sense determined by the direction detector. The clock and data signals received at the remote station are efficiently regenerated so that all line losses are compensated for, this end result being achieved by virtue of clock and data switch means which generate new clock and data signals in response to the clock and data signals detected on the line.

DESCRIPTION OF THE PREFERRED EMBODIMENTS

Figure 1:
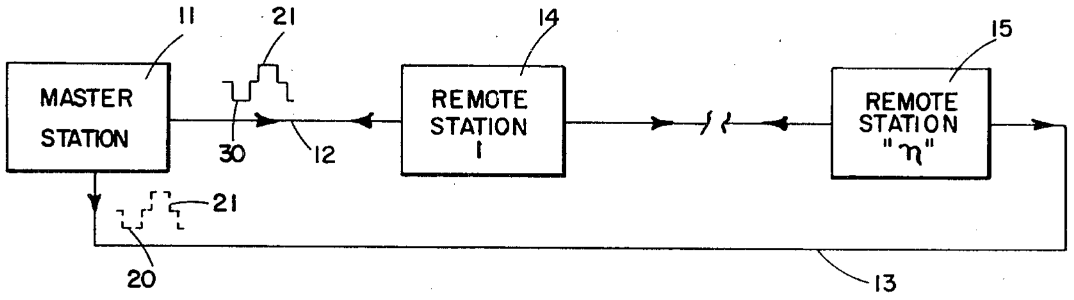
FIG. 1 is a block diagram illustrating the general manner of operation of the system of the invention.

Referring now to FIG. 1, the general manner of operation of the system of the invention is illustrated. Master station 11 is connected by a single wire 12 to remote Station "1," 14. Remote station "1," 14 in turn is connected to a second remote station (not shown), a plurality of similar remote stations being similarly connected in serial fashion on down to remote station "*n*," 15. Remote station "*n*," 15, is directly connected back to master station 11 by means of a single wire 13.

Figure 2:
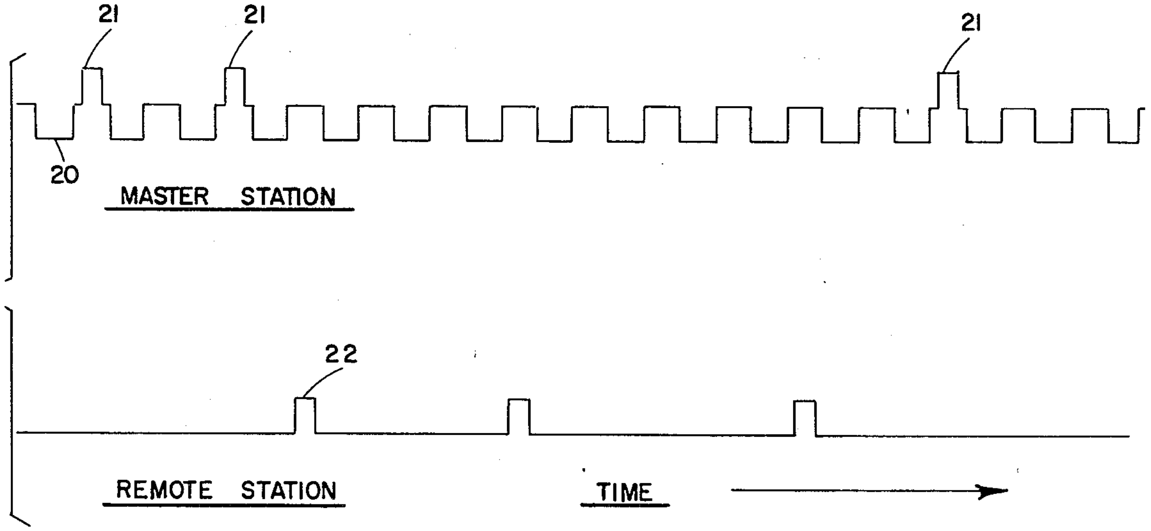
FIG. 2 illustrates a series of typical waveforms that may be transmitted in the system of the invention.

Referring now additionally to FIG. 2, a plurality of negative going clock pulses 20 are transmitted on line 12 from master station 11 to remote station 14. These pulses are indicated in FIG. 2 in the waveform located above the legend "Master Station." Clock pulses 20, as to be explained more fully further in the specification, establish the synchronization of the system which enables the correlation of the data transmitted by master station 11 and returned to the master station from the remote stations. A predetermined time interval is provided between succeeding clock pulses 20 to permit the transmission of data "bits" 21 from the master station to the remote stations and in turn for the transmission of data bits 22 from the remote station back to the master (shown in FIG. 2 above the legend "Remote Station").

The data bits 21 in the particular exemplary illustration are represented as positive going pulses while the clock pulses 20 are shown as negative going. Let us assume that a complete active time cycle for each remote station is completed with a sequence of 16 clock pulses 20. Data is transmitted from the master station in the example of FIG. 2 after the first, third and thirteenth clock pulses. Each of the clock pulses is associated with a "bit" in the remote stations. The first, third and thirteenth "bits" are established in this example as master station "transmit bits" or remote station "receive bits." Assuming that data in the illustrative example is being transmitted on all of the remote station preestablished "receive bits," then the remaining bit times are remote station data "-transmit bits." In the example shown in FIG. 2, data is only being transmitted from the remote station during the fourth, seventh and eleventh "bits," each of these bits being associated with a particular function associated with the bit number and thus identifiable at the master station. Similarly, the bit numbers of the remote station "receive bits" are identified with specific functions.

As to be explained fully further on in the specification, each of the remote stations has a counter which counts up the clock pulses, data being received by the remote stations as transmitted from the master station after certain of the clock pulses, and being transmitted back to the master station in response to certain others of these clock pulses until a complete cycle of clock pulses has been counted. When this condition occurs, the counter goes to overflow and the remote station then goes to an inactive mode of operation and operates to bypass data and clock pulses from the master station through to succeeding remote stations, and to bypass data from any of these remote stations back to the master station. Such interrogation and data transmission to and from each of the remote stations is continued right on through to the last remote station 15. Then master station 11 operates to transmit to the remote stations in an opposite direction, i.e., through line 13, each of the remote stations thus being interrogated in an opposite order. The remote stations are thus alternately interrogated first in one order and then in an opposite order. This alternate method of interrogation, first through line 12 and then through line 13, operates to provide an access path to all stations even in the event of a break in a line between any two stations. In a typical embodiment of the device of the invention, a complete active cycle for each remote station is completed in a small fraction of a second so that a continuous and current data flow is provided between the master station and all of the remote stations.

Figure 3:
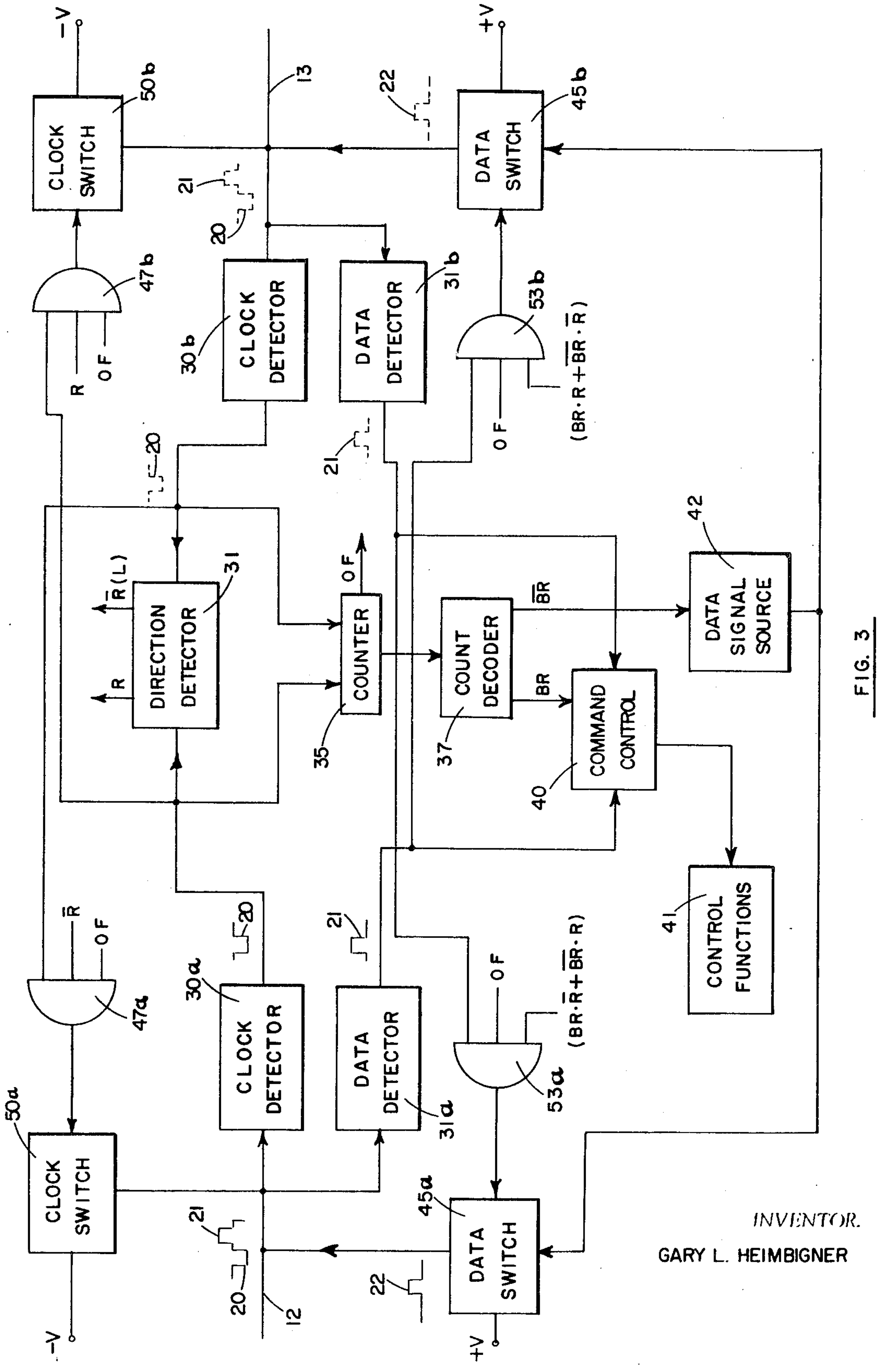
FIG. 3 is a block diagram illustrating the basic operation of a remote station of the system of the invention.

Referring now to FIG. 3, a functional block diagram illustrating the operation of the remote stations is shown. The clock pulses 20 and data pulses 21 arriving from the master station are fed to clock detector **30*a* and data detector 31*a*, the clock detector being sensitive only to the negative going clock pulses 20, while the data detector is sensitive only to the positive going data pulses 21. The clock and data detectors comprise devices such as transistors arranged so that they are responsive solely to negative or positive inputs respectively. Clock pulses 20 are fed to direction detector 31, the direction detector providing an output "R" indicating that the pulses in this instance are traveling to the right. Clock pulses 20 are also fed to counter 35 to provide a count input thereto. The counter stages are connected to count decoder 37 which provides output signals to command control 40 and data signal source 42 which are indicative of the state of the counter, i.e., the particular "bit" to which the counter has counted. Signals indicative of the remote station "receive bits," BR, (the first, third and thirteenth bits in the example of FIG. 2) are fed to command control 40. Signals indicative of all the other "bits" during which data can be transmitted from the remote station to the master are fed as "Not Bit Receive," $\overline{BR}$, inputs to data signal source 42**.

The data signals 21 are fed from data detector **31*a* to command control 40. These data signals are time correlated with their preassigned functions in the command control by means of the BR signals received from count decoder 37, as to be explained more fully in connection with FIG. 5. Command control 40 operates to control various predetermined control functions 41. Also, as to be discussed in connection with FIG. 5, the data signals generated in data signal source 42 are time correlated with their assigned functions by means of the $\overline{BR}$ signals received from the count decoder. The outputs of data signal source 42 which are pulses appearing after particular clock pulses in the pulse train, thus identifying specific functions, are fed as drive signals to data switch 45*a* and actuate this switch to generate data signals 22 for transmission on the single wire line 12, back to the master station. In the illustrative example shown in FIG. 2, it can be seen that the data pulses 22** are time correlated with the fourth, seventh and eleventh pulses in the clock pulse train.

Clock and data signals arriving on line 13 from the opposite direction are handled in similar fashion to the operation just described for the signals on line 12, this by means of clock detector **30*b* and data detector 31*b*, with data signals being transmitted by data switch 45*b* in response to the data signal source. In this instance, clock detector 30*b* provides a signal to direction detector 31** so that this detector generates an $\overline{R}$ output indicating that the signals are moving to the left, i.e. "not right."

When counter 35 has reached its full count for any remote station cycle (when 16 clock pulses have been received for the example of FIG. 2), the counter generates an overflow signal, OF. This overflow signal is utilized in logical gating circuitry to enable the bypassing of signals through the remote station in either direction. This bypassing mode of operation will hereinafter be referred to as the "inactive" mode of operation of the remote stations, the period when a station is receiving and transmitting signals being referred to as its "active" mode.

Let us first assume that clock pulses are being received from the left on line 12, i.e., are moving to the right. In such event, direction detector 31 will have an "R" output. The output of clock detector **30*a* is fed to AND gate 47*b* along with the "R" and "OF" signals. Clock pulses 20 arriving from the left-hand side will therefore be fed through AND gate 47*b* to clock switch 50*b*, activating this switch so as to produce a clock pulse on the output line. Data signals 21 arriving on line 12 are fed through data detector 31*a* to AND gate 70*b*. This gate also receives the overflow signal, OF, and a logically derived gating signal, as to be explained more fully in connection with FIG. 4, which represents the condition $BR.R.+\overline{BR}.\overline{R}$. Data switch 45*b* will thus be activated to bypass signals through the remote station when the count decoder indicates "bit receive" and clock signals are moving to the right, (i.e., being received from the left) or when the count decoder indicates "not bit receive," i.e., when a remote station to the left is transmitting, and the clock pulses are moving to the left, i.e., arriving from the master station on line 13**.

Similarly, data signals arriving on line 13 at data detector **31*b* are switched through the remote station by means of AND gate 70*a* which activates data switch 45*a***, this in response to the logic $BR.\overline{R}+\overline{BR}.R$.

The system of the invention thus enables an active remote station mode for a predetermined count and an inactive bypass mode once this count has been completed, during which signals and clock pulses are passed through the station in either direction so as to provide communications between the master station and another remote station.

Figure 4:
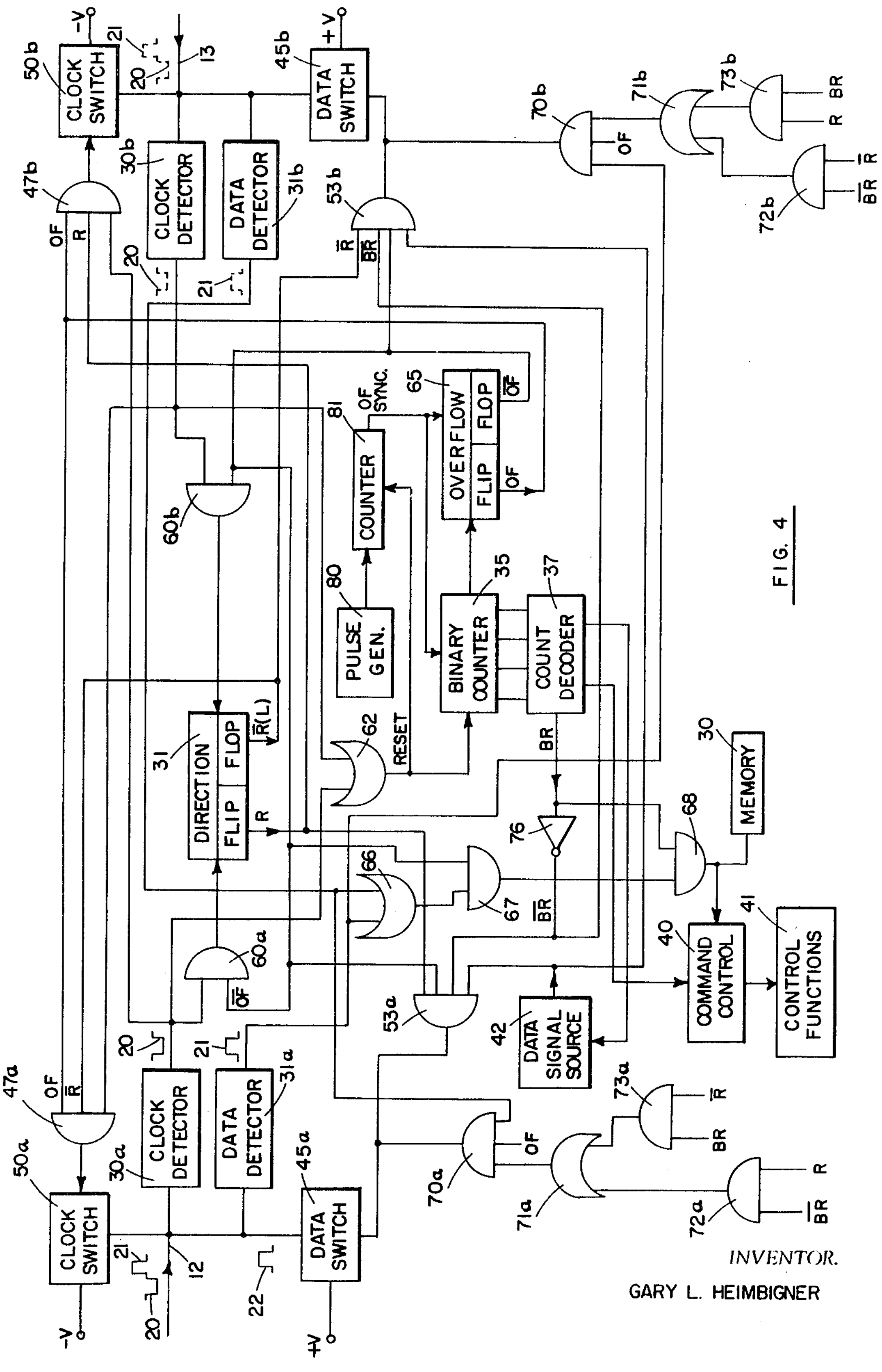
FIG. 4 is a functional schematic drawing of one embodiment of a remote station of the system of the invention.

Referring now to FIG. 4, one embodiment of the remote station of the system of this invention is illustrated. In this embodiment the same numerals are utilized to identify similar components shown in FIG. 3.

The clock pulses 20 and the data pulses 21 arriving on line 12 are separated from each other by means of clock detector **30*a* and data detector 31*a*, as already described in connection with FIG. 3. The clock and data detectors, as already noted, may comprise gates sensitive only to negative and positive going signals respectively. The clock signals are fed from clock detector 30*a* to AND gate 60*a*. AND gate 60*a* also receives a no overflow, $\overline{OF}$, signal from overflow flip-flop 65 indicating that the binary counter 35** has not reached its overflow state and that the remote station therefore is in its "active" mode of operation.

Clock pulses 20 are also fed from clock detector **30*a* to OR gate 62 and thence to binary counter 35. The binary counter is thus driven by each clock pulse arriving on line 12 progressively changing its state with each successive input pulse. The particular count state of binary counter 35 is decoded by means of count decoder 37, as to be described in connection with FIG. 5, the count decoder providing bit identifying outputs to command control 40 and data signal source 42**.

As the clock signals are being processed, the data signals arriving on line 12 are fed through data detector **31*a* to OR gate 66 and thence to AND gate 67. AND gate 67 also receives an $\overline{OF}$ signal from overflow flip-flop 65 indicating that the remote station is in its "active" operating mode and under such conditions passes the data signal through to AND gate 68. AND gate 68 receives as its other input the bit receive, BR, output of count decoder 37 indicating that the bit count corresponds to one of the remote station receive times. Under such conditions, the data signals are fed through AND gate 68 to command control 40, enabling the particular functions 41 called for by the master station. Data signals from the master station are also fed to memory 70** to provide test signal information and the like.

During the bits associated with the transmission of data from the remote station, signals generated by data signal source 42 are fed through AND gate 53*a* to actuate data switch 45*a*. Such actuation occurs when AND gate 53*a* also receives a $\overline{BR}$ output from inverter 76 indicating that it is not a bit receive time as well as an $\overline{OF}$ signal from the overflow flip-flop 65 and an R signal from the direction flip-flop 31.

When binary counter 35 has counted through a complete cycle of remote station operation, it reaches its overflow state and provides a signal to overflow flip-flop 65, driving this flip-flop to the OF state. When this occurs, the remote station goes to its "inactive" mode of operation and bypasses signals received on either lines 12 or 13 in the following manner: Clock signals 20 arriving on line 12 are fed through clock detector 30*a* to AND gate 47*b*. AND gate 47*b* also receives an "R" signal from direction flip-flop 31 indicating the pulses are moving to the right, and an OF signal from overflow flip-flop 65 indicating the overflow condition, and therefore passes the clock signal on through to clock switch 50*b*, thereby generating a clock signal on line 13. Clock switch 50*b* may be an electronic switch which generates a negative going signal in response to the clock pulses received thereby.

Similarly, clock pulses received on line 13 are fed from clock detector 30*b* through AND gate 47*a* to actuate clock switch 50*a*, thereby producing a clock signal on line 12.

Data signals arriving on line 12, which may include both data from the master station and data arriving from other remote stations, are fed through data detector 31*a* to AND gate 70*b*. When this AND gate is receiving an overflow signal, OF, from overflow flip-flop 65, and also is receiving an input from OR gate 71*b*, the data signal is fed through the gate to actuate data switch 45*b* thereby producing a data signal on line 13 in response to the data signal received on line 12. OR gate 71*b* generates a true output in response to a true output from either AND gate 72*b* or AND gate 73*b*. AND gate 72*b* generates a true output when $\overline{BR}$ and $\overline{R}$ are both present, while AND gate 73*b* generates a true output when R and BR signals are both present. This logical circuit permits the bypass of data signals during the receive bit times when the signals from the master station are moving to the right, thereby bypassing data arriving from the master to another remote station, and also permits the bypassing of data signals from another remote station when the signals from the master station are moving to the left and it is not a receiving bit time.

The handling of signals arriving on line 13 during the active mode of operation of the remote station is exactly the same as that described for the signals arriving on line 12, the various components for handling this being labeled with a number corresponding to their counterparts described in connection with the signals on line 12. Similarly, during the inactive mode, signals arriving from the opposite directions just described are bypassed through the station in the same manner just set forth, again corresponding numerals being used to identify like components which perform the same functions described.

Synchronization of operation is achieved by means of pulse generator 80 and counter 81 operating in the following manner: Synchronization is established by providing breaks in the clock pulses transmitted from the master station at predetermined intervals. Pulse generator 80 is a free running oscillator which drives counter 81. When clock pulses are arriving from the master station, these clock pulses are fed from OR gate 62 to counter 81 as a reset signal therefor. Thus, under these conditions the counter never is driven to any significant count. However, when the transmission of clock pulses is interrupted at the predetermined synchronization times, counter 81 is driven to overflow by pulse generator 80 and the overflow signal therefrom is utilized to reset both overflow flip-flop 65 and binary counter 35, the former so that it is in its $\overline{OF}$ state and the latter so that it is reset to zero, thus setting the counter and the overflow flip-flop for a subsequent cycle of operation.

Figure 5:
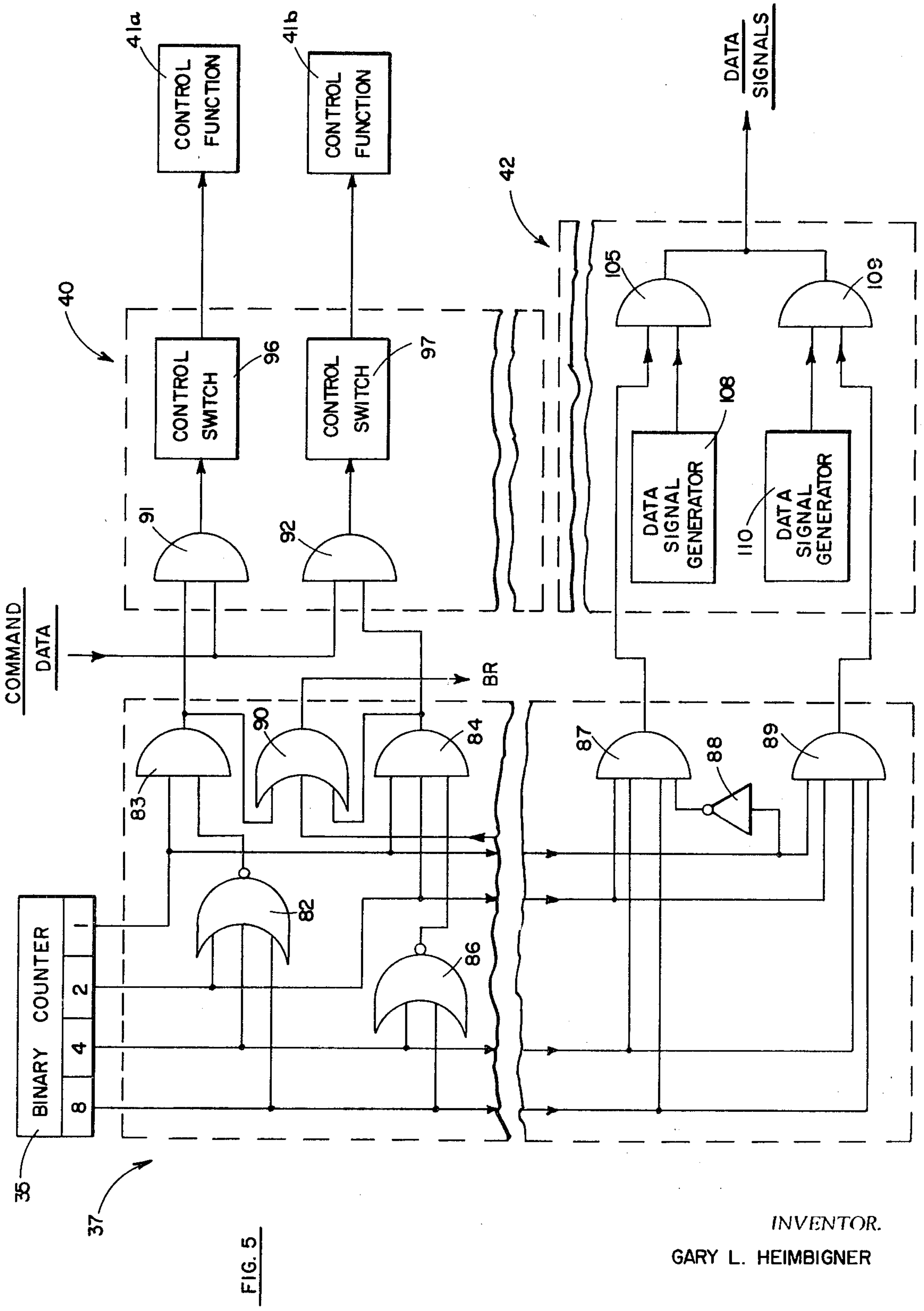
FIG. 5 is a functional schematic illustrating a typical implementation for the count decoder, command control and data signal source of the embodiment of FIG. 4.

Referring now to FIG. 5, circuitry which may be utilized for the count decoder, command control and data signal source are illustrated. As shown, binary counter 35 is a four bit counter capable of providing counts up to 16. Each count is identified and earmarked for utilization with a specific data signal or control function by means of logical gating circuitry in the following manner: The "1" count is provided through AND gate 83 to command control 40 as follows: AND gate 83 receives the "1" bit output of the binary counter and also receives the output of NOR gate 82. NOR gate 82 receives the outputs of the "2," "4" and "8" bits of the counter. Thus, when none of these bits are activated, the NOR gate will have a TRUE output to AND gate 83. AND gate 83 will therefore have a TRUE output when the "1" bit is present and none of the other bits are present. The "3" count output is provided through AND gate 84 to command control 40 as follows: AND gate 84 receives the "1" and "2" bit outputs of binary counter 35 and also receives the output of NOR gate 86. NOR gate 86 receives the "4" and "8" outputs of the counter. Therefore, AND gate 84 will have a TRUE output when the "1" and "2" bits of the counter are activated and the "4" and "8" outputs of the counter are not activated, thus providing the desired TRUE signal from gate 84 when the "3" count occurs.

OR gate 90 receives the outputs of AND gates 83 and 84 and the other AND gate (not shown) involved with a "bit receive" function so that when the "receive" bits are activated, this OR gate provides a "BR" output signal.

Signals are similarly provided by means of AND gate 87 for the "14" count, and AND gate 89 for the "15" count, inverter 88 being utilized to provide the logic to indicate when the "1" bit is not activated. The outputs of AND gates 87 and 89 are fed to data signal source 42.

Referring at this point to FIG. 2, as we can see, the "1" and "3" counts are "BR" counts, during which command signals are transmitted from the master station to a remote station and are utilized by the command control 40 to generate command signals for control functions 41*a* and 41*b*. The command data is fed to AND gates 91 and 92. The output of AND gate 83 indicative of a "1" count is fed to AND gate 91, while the output of AND gate 84 indicative of a "3" count is fed to AND gate 92. Thus, the command data pulse 21 arriving immediately subsequent to the first clock pulse will produce a TRUE output from AND gate 91, this TRUE output actuating control switch 96. Control switch 96 operates control function 41*a* which may, for example, involve the testing of read and call lamps. Similarly, AND gate 92 will have a TRUE output and actuate control switch 97 immediately subsequent to the third clock pulse in the cycle sequence in response to command pulse 21, this control switch operating to activate control function 41*b*.

The output of AND gate 87 is fed to AND gate 105 in data signal source 42. Also fed to AND gate 105 is the output of data signal generator 108. Thus, AND gate 105 will have a TRUE output to provide a data signal for transmission back to the master station at the end of the fourteenth count in the cycle, if there is at this time a signal output from data signal generator 108. Similarly, AND gate 109, which receives signals from AND gate 89 and data signal generator 110, will produce a data signal at the end of the fifteenth count in the event that data signal generator 110 is activated at this time.

In this manner, each of the command control and data signal transmission functions are time correlated so that they are properly associated with their control and information functions, as the case may be.

The system of this invention thus provides highly effective means for enabling bidirectional communication between a single master station and a plurality of remote stations on a single wire.

I CLAIM:

1. A digital multiplexing system for communicating time multiplexed clock pulses and digital signals comprising, at least one master station, a plurality of remote stations serially connected on a single wire, said master station operable to bidirectionally transmit said clock pulses and digital signals to each of said remote stations sequentially while that station is in an active operating mode, interconnecting means connecting said master station and the first and last of said serially connected remote stations to provide two mutually opposite signal paths for sequential interrogation of said serially connected remote station by said master station, each of said remote stations having an active mode of operation during which said remote station is interrogated by said master station and an inactive mode of operation during which said clock pulses and digital signals are transmitted through said remote stations in either of said mutually opposite directions, each of said remote stations having means for deactivation to said inactive mode of operation when a predetermined bit count for said remote station is completed, said clock pulses and digital signals thereby being bypassed through said remote station in either of said mutually opposite directions, each of said remote stations bypassing said clock pulses and digital signals by switch means wherein said clock pulses and digital signals are regenerated, each of said remote stations further having synchronization means responsive to said master station for resetting said means for deactivation to provide for succeeding cycles of interrogation of said remote station.

2. A remote station for a digital multiplexing system, having an active mode of operation during which digital data and clock pulses are communicated thereby to at least one master station, and an inactive mode of operation during which said data and clock pulses are bypassed therethrough in either of two mutually opposite directions, each of said clock pulses being associated with a predetermined data bit, said remote station comprising a first channel responsive to digital signals received in a first direction from said master station, said first channel operable to provide said digital data and clock pulses for control of functions at said remote station, and a first signal bypass channel associated therewith, a second channel responsive to digital signals received from said master station in a second circuit direction opposite from said first direction, said second channel operable to provide said digital data and clock pulses for control of said functions at said remote station, and a second signal bypass channel associated therewith, said signal bypass channels operable to provide mutually opposite paths to gate said digital data and clock pulses through said remote station when said remote station is in an inactive mode of operation, and said first and second channels are further operable to receive said digital data and clock pulses from said master station and to transmit data back to said master station in the direction from which said digital data and clock pulses are received during said active mode of operation, and said first and second signal bypass channels are operable to bypass said digital data and clock pulses arriving by either of said opposite paths during said inactive mode of operation.

3. In a system for transmitting digital data and a train of clock pulses from a master station to a plurality of remote stations and for transmitting data from each of said remote stations to said master station, each bit of said data being associated with a predetermined clock pulse in said train, said master station and said remote stations being serially interconnected by a single line, said line interconnecting said master station and the first and last of said serially interconnected remote stations for communication therebetween to provide interrogation of said remote stations by said master station in either of two mutually opposite directions, the improvement comprising means in each of said remote stations for successively operating said remote stations in an active mode during which data is communicated thereto and therefrom in either of said opposite directions and for operating said stations in an inactive mode during which data and clock pulses arriving at said remote stations from either direction are regenerated and bypassed through said remote station.

4. The system of claim 3 wherein said active mode operating means includes counter means for counting said clock pulses, count decoder means for generating signals in accordance with each predetermined pulse in said train and first means responsive to predetermined signals from said count decoder means for generating data signals for transmission on said line and second means responsive to other predetermined signals from said count decoder means for generating command control signals in response to data arriving from said master station.

5. The system of claim 3 wherein the inactive mode operating means includes direction detector means for detecting the direction in which said clock pulses are arriving, counter means for counting said clock pulses, overflow detector means responsive to said counter means for generating a signal when said counter means has counted all the pulses in said train, switch means for regenerating said data and clock pulses, and logical gating means responsive to said overflow detector means and said direction detector means for activating said switch means to place data and clock pulses arriving at each of said remote stations from one direction on the line running from said stations in a direction opposite to said one direction.

6. A system for transmitting digital data and a train of clock pulses from a master station to a plurality of serially connected remote stations and data from each of said remote stations to said master station by each of two alternative paths, each of said clock pulses being associated with a particular bit of said data, comprising:

said master station operable to bidirectionally transmit digital signals to each of said remote stations for sequential interrogation of each of said remote stations by said master station, interconnection means connecting with a single wire said master station and the first and last of said serially connected remote stations to provide two mutually opposite signal paths for sequential interrogation of said serially connected remote stations by said master station, means in each of said remote stations for receiving said data and clock pulses from said master station and for transmitting data back to said master station in the direction from which said clock pulses are received during an active mode of operation, and means for bypassing data and clock pulses through each of said remote stations during an inactive mode of operation, pulses arriving by one of said alternative paths being bypassed in one direction, pulses arriving by the other of said paths being bypassed in a direction opposite to said one direction.

7. The system of claim 6 wherein said means for bypassing said pulses comprises means for regenerating said pulses in response to the pulses arriving at said remote station.

8. The system of claim 6 wherein said means for transmitting data in the direction from which said clock pulses are received includes direction sensing means for sensing the direction from which said clock pulses are arriving and logical gating means responsive to said direction sensing means for gating said data to said line.

9. The system of claim 6 wherein said means for receiving said clock pulses includes a counter, said counter being adapted to go an overflow condition when all of the pulses in said train have been counted, said inactive mode of operation being initiated and maintained in response to said overflow condition.

10. The system of claim 9 and further including count decoder means responsive to said counter for generating signals indicating the particular digital bit to which said counter has counted, and means for correlating each of said signals with the bit of data associated therewith.

11. In a system for communicating time multiplexed clock pulses and digital data between a master station and a plurality of remote stations on a single wire, each of said remote stations having an active mode of operation during which data is communicated thereby, and an inactive mode of operating during which data and clock pulses are bypassed therethrough in either direction, the improvement comprising:

means in each of said remote stations for communicating data between said master station and each of said remote stations during an active mode of operation comprising:

counter means for counting the clock pulses, each of said clock pulses being associated with a predetermined data bit, count decoder means for generating output signals in accordance with the count of said counter means, command control means for receiving data signals arriving at said remote station from said master station, signals being fed from said count decoder means to said command control means to time correlate said data signals, data signal source means for generating signals for transmission form said remote station to said master station, said data signal source signals being time correlated with the associated count signals from said count decoder means, said counter means counting through a predetermined number of counts, each of said counts being associated with a particular data bit and then generating a signal indicating an overflow condition, and means for bypassing data and clock signals arriving at said remote station from either direction through said remote station when said counter means indicates overflow during an inactive mode of operation.

12. The system of Claim 11 wherein said bypassing means includes first clock switch means for generating clock pulses for transmission from said remote station in one direction, first data switch means for generating data signals for transmission in said one direction, second clock switch means for generating clock signals for transmission from said remote station in a direction opposite to said one direction, second data switch means for generating data signals for transmission form said remote station in said opposite direction, and gating means for each of said clock switch means and said data switch means, the gating means for the data switch and clock switch means associated with said first direction operating to activate the associated switch means in response to data and clock signals received from the opposite direction, the gating means associated with said clock switch means and said data switch means for the opposite direction operating to activate the associated switch means in response to data signal and clock signals arriving from the first direction, and direction detector means for controlling said gating means.

13. In combination, a master station for generating a train of clock pulses and data signals associated with particular clock pulses in said train and a plurality of remote stations, each of said remote stations operating to generate control functions in response to data signals received from said master station and transmitting data signals back to said master station, each of the data signals from said remote stations being associated with a particular clock pulse of said train, said master station and said remote stations being interconnected by wires forming a closed loop therebetween for communications in either of two directions, each remote station including means for correlating each of said clock pulses with its associated control function, command control means responsive to said correlating means and said data signals for controlling said functions, means for correlating the data signals generated at the remote station with said clock pulses, means responsive to said correlating means for generating data signals associated with each of said clock pulses for transmission to said master station, means for sensing the direction in which clock and data signals are being received at said remote station, counter means for generating an overflow signal when said clock pulse train has completed a cycle, and means responsive to the direction sense detected by said direction detector means and said overflow signal for bypassing clock and data signals arriving at said remote station through said station in the same direction in which they are arriving at said station.

14. The system as recited in claim 13 wherein said bypassing means includes means for regenerating the clock and data signals in response to the clock and data signals received at said remote station.

15. A method for communicating digital data on a single line between a master station and a plurality of remote stations, each bit of said digital data being associated with a predetermined pulse of a clock pulse train transmitted by said master station comprising the steps of transmitting a clock pulse train and data from said master station to each of said remote stations successively in a first order, correlating each of the data signals with its associated clock pulse at the remote station and performing a predetermined control function in response thereto, generating data signals at each remote station in response to clock pulses associated therewith, transmitting said data signals to said master station when all of the clock pulses in the train have been received by a remote station bypassing clock pulses and data received at said station from either direction through said station, and when the clock pulse train has been successively transmitted to said remote stations in said first order, successively transmitting said pulse train to said remote stations in an order opposite said first order.

16. The method of Claim 15 wherein the bypassing of said clock pulses and data includes the regenerating of said pulses and data at each of said remote stations in response to data and clock pulses received thereby.

17 A remote station for a digital multiplexing system comprising: direction detector means for detecting from which of two mutually opposite directions clock pulses are arriving from a master station, counter means for counting said clock pulses, count decoder means for generating signals in response to predetermined ones of said clock pulses, data signal source means responsive to predetermined signals from said count decoder means for generating data signals for transmission to said master station, data switch means responsive to said data signal source means for transmission of data signals back to said master station, command control means responsive to other predetermined signals from said count decoder means for generating signals for control of said remote station functions, overflow detector means responsive to said counter means for generating a signal when said counter means has counted a predetermined number of clock pulses, switch means responsive to said overflow detector for regenerating and bypassing digital data and clock pulses received by said remote station in either of said mutually opposite directions, and synchronization means responsive to said master station operable to reset said overflow detector means and said count decoder means to provide for succeeding cycles of interrogation of said remote station.